Nov. 3, 1970    L. E. GARDNER    3,537,237
METHOD OF RECOVERING COMPONENTS FROM A GAS STREAM
Filed May 14, 1969
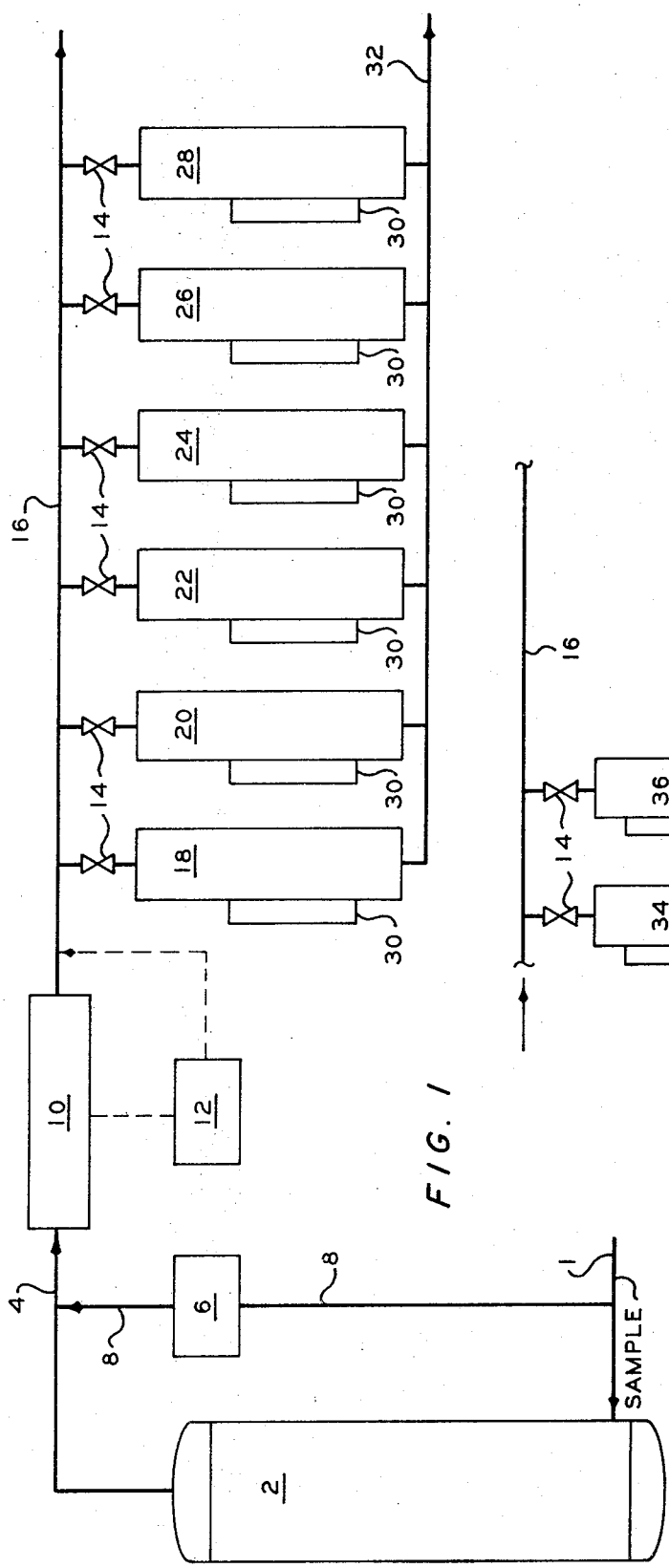
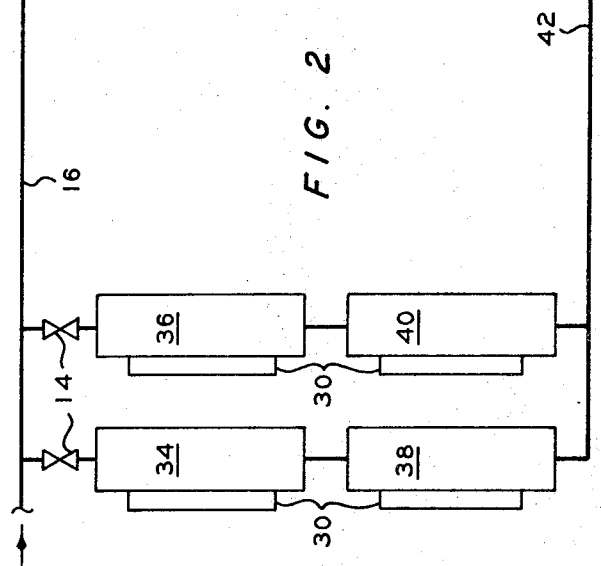
INVENTOR.
L. E. GARDNER
BY Young & Quigg
ATTORNEYS

United States Patent Office 3,537,237
Patented Nov. 3, 1970

3,537,237
METHOD OF RECOVERING COMPONENTS FROM A GAS STREAM
Lloyd E. Gardner, Bartlesville, Okla., assignor to Phillips Petroleum Company, a corporation of Delaware
Filed May 14, 1969, Ser. No. 824,500
Int. Cl. B01d 15/08
U.S. Cl. 55—67                           7 Claims

ABSTRACT OF THE DISCLOSURE

A method of automatically recovering gas components from a separated gas stream by passing the components through a gas detector, automatically switching the stream through a different individual adsorber containing different adsorbing material as the component flow changes through the detector.

This invention relates to recovering components. Another aspect of this invention relates to recovering components eluting from a gas chromatographic fractionation column.

Gas chromatography involves a chromatographic separation of various compounds, sample materials, mixtures, and the like, as gas chromatographic fractions from a gas sample stream. Preparative or production scaled gas chromatography includes the recovery of one or more of these fractions from the gas effluent stream withdrawn from the chromatographic column. The gas effluent stream comprises the carrier gas and the fraction of the gas phase to be recovered or removed.

The usual techniques of fraction collecting involve direct refrigeration or cooling of the fraction-containing gas effluent stream to condense the fraction to the liquid or solid state. The fraction condensed is then recovered from the cooled surfaces of the condensing vessel. These means are usually quite direct, however, the efficiency of collection, i.e., the percent of the gas fraction recovered, is quite often low, and where difficulty separated, expensive or exotic fractions are to be collected or removed, these direct means may be economically unattractive and/or inadequate. Collection efficiencies of 90 percent or higher are often desirable or required for the economic use of preparative or production scale gas chromatography systems. The preparative systems employ chromatographic column having a diameter of ¼ to about 6 inches, while production scale systems refer to larger diameter columns such as 1 to 4 feet or greater. In preparative and production scale chromatographic systems, the fixed capital and operating costs of a high efficiency fraction collection scheme employing a refrigeration system alone is often a considerable part of the total fixed and operating costs of the total chromatographic system. It is, therefore, more desirable to provide fraction collecting systems of reduced cost and high efficiency.

The fraction collecting of the gas effluent from a gas outlet of a gas chromatographic column has a very low concentration of the gas fraction to be recovered. If the fraction to be recovered exceeds 50 percent or more in the gas effluent stream, direct cooling has been the heretofore preferred method of collection, while lesser amounts such as less than 25 percent has heretofore required special techniques for collecting efficiencies of 90 percent or more. For example, the effluent gas stream may typically contain only 0.1 to 10.0 mol percent of the desired gas fraction in the inert carrier gas stream. Where very expensive sample material such as steroids, essential oils, flavors, special research mixtures, and the like, are processed, the amount of sample fraction in the effluent gas stream may be even lower, such as from 0.001 to about 0.1 mol percent. The deletion of the sample vapor from the inert carrier gas, therefore, represents problems in fractionation collecting. Rapid and direct cooling of the effluent stream to condense the desired fraction provides condensation, but quite often in the form of a fog or aerosol of the fraction in the carrier system which makes the subsequent recovery of the fraction increasingly more difficult than expensive.

One of the most common heretofore utilized methods of recovering the gas fraction from a gas effluent stream is to withdraw the gas effluent stream from the chromatographic column and introduce the stream into a cold trap to induce condensation of the gas fraction. This collection technique often provides poor efficiency of collection, particularly where the gas fraction to be recovered is less than 5 percent of the gas effluent stream. Rapid and shock cooling of the gas effluent stream causes formation of aerosol or fog of minute condensed droplets of the gas fraction in the gas effluent stream, Such aerosol or fog droplets are particularly difficult to coalesce, and flow out of the collection system with the carrier gas when the droplets are of the order of 1 to 10 microns or less. There have been several previous proposals to improve the collection efficiency such as by super-heating the gas effluent stream and then cooling the stream to the condensation temperature of the gas fraction. Another proposal has been to employ a carrier gas stream that condenses at the cooling or condensation temperatures employed for the gas fraction. Conventional cold trap systems have been modified by inserting in the system a (hot finger) to reduce the formation of the aerosol particles. A stream of hot water is passed through the hot finger, while the external walls of the surrounding cold trap maintained at the condensation temperature. However, none of these prior proposals or schemes have been entirely satisfactory in increasing the efficiency of the collecting systems and in effecting a significant reduction in the aerosol particle formation. Another problem solved with the method and apparatus of this invention is the preparation of fluoro carbons of high volatility. These high volatility fluoro carbons cannot be trapped cryogenically as long as a carrier gas like helium is flowing. The desired separation and recovery can be made however with the adsorption column of this invention at ambient or slightly below ambient temperatures. Discovery of a means for recovery large quantities of highly volatile fluoro carbons therefore represents an important breakthrough and an opportunity to further advance the art.

It is, therefore, an object of this invention to provide a system for the efficient recovery of gas fractions. It is another object of this invention to provide a method for efficiently collecting production scale gas fractions from a gas effluent stream. Yet another object of this invention is to provide a method for recovering components eluting from a gas chromatographic fractionation column wherein the recovered components from a gas chromatographic fractionation column wherein the recovered components will be of improved purity. A further object of this invention is to provide means for recovering large volumes of highly volatile fluoro carbons from a gas stream.

Other aspects, objects, and advantages of the present invention will become apparent from a study of the disclosure, the appended claims, and the drawing.

In the drawing, FIG. 1 is a schematic diagram of the apparatus utilized in the method of this invention. FIG. 2 of the drawing is a partial view of another embodiment of the apparatus utilized in the method of this invention.

Referring to FIG. 1, a gas stream containing a plurality of separable components flows through line 1, is mixed therein with a carrier gas flowing from a carrier gas source 6 through line 8 and into line 1, and the mixture is thereafter passed through a chromatographic fractionation column 2 or other equipment utilized to separate various components of a gaseous stream. The separated components of the gas each mixed with the carrier gas pass through line 4 separated from one another.

The carrier gas as utilized in this invention can be selected from a group of inert carrier gases such as helium, nitrogen, argon, air, steam, hydrogen, methane, and the like, and mixtures thereof. It is preferred that helium be used as the carrier gas of this invention owing to its inert qualities and ready availability.

The carrier gas and sample components thereafter enter a gas detector 10. The detector employed may be a pair of thermal conductivity cells which balance the heat conduction of the gas effluent stream from the exit end of the chromatographic column against the pure carrier gas used in order to detect a particular gas fraction being withdrawn from the column. Depending upon the system employed, other detectors such as flame ionization detectors, electron capture detectors, argon ionization detectors, cross-section detectors, electron mobility detectors, ultra-sonic detectors, radio frequency detectors, gas density balances, mass spectrometers, and other fraction identifying or detecting means may be employed. In large diameter columns or systems, the detecting means may be omitted and the operations of the system programmed from data obtained on analytical or pilot systems. In such large systems, it is preferred in this invention that the detector be utilized in order that switching times are more accurately controlled.

A signal is delivered by the detector 10 responsive to the measurement of the portion of the gas sample passing through said detector. A signal actuating means 12 receives and records the signal from the detector 10, compares the signal to programmed input data and thereafter delivers a signal representative of the signal from the detector 10 to control valves 14 associated with the gas header 16.

The signal actuating means 12 of this invention can be programmed to switch the flow of the sample stream from one gas recovery means to another by actuating the control valves 14 upon receipt of various signal conditions as received from the detector 10. For example, a switch can be signalled by the signal actuating means 12 upon receipt of a certain minimum signal during a period when said received signal is descending. The actuating means 12 can also be programmed to actuate valves upon the receipt of an ascending signal, or after the signal increases subsequent to decreasing below a preset value. Many other programming procedures can be utilized in the method of this invention so long as the gas stream passing into the detector 10 is directed into a different adsorber when there is a change of constituent flow through said detector.

The gas stream discharging from the detector flows into a conventional gas header 16 having a plurality of control valves 14 connected thereto. The control valves 14 are normally closed valves which are actuated in response to a signal delivered from the signal actuating means 12. It is preferred that the valves be solenoid valves in electrical communication with the signal actuating means 12 to provide for the automatic and sequential opening and closing of said valves.

Separate, individual adsorbers 18, 20, 22, 24, 26, and 28 each containing the same or different adsorption material, depending upon the desired recovery procedure, are connected to a separate valve and are in communication with the gas stream within the gas header 16. A greater or lesser number of adsorbers can be employed in the method of this invention, the number utilized depending upon the number of different components desired to be separated and recovered from the sample stream.

Temperature controllers, generally indicated by numeral 30, are attached to each adsorber and are adapted to maintain the temperature of each individual adsorber within a temperature range preselected for the particular adsorbing material of that adsorber.

Fluid discharging from each adsorber passes into and through line 32 and is thereafter removed from the system.

Referring to FIG. 2, first and second primary adsorbers 34, 36 are attached to individual control valves 14 associated with the gas header 16. Gas flowing from the gas header 16 and through a primary adsorber 34 or 36 is thereafter passed through the respective first or second secondary adsorbers 38 or 40. Fluid discharging from the secondary adsorbers 38, 40 flows into line 42 and is thereafter removed from the system. Temperature controllers 30 are associated with the primary and secondary adsorbers 34, 36, 38, 40 to maintain the temperature of each individual adsorber within a temperature range preselected for the adsorbing material of that adsorber. This adsorber arrangement has been found particularly effective in the recovery of certain highly volatile fluoro carbons.

In the operation of this invention, a sample gas containing a plurality of components which are desired to be separated and recovered is mixed with a carrier gas and passed through a conventional fractionation column 2 or other gas separating devices such as a chromatographic column. Referring to FIG. 1, the components of the sample gas separate within the column 2 and are discharged through line 4 at intervals spaced from other components of the sample and flows into gas detector 10.

Gas flowing to the gas detector is measured and a signal representative of said gas is delivered to the signal actuating means 12. The detector signal is recorded by the actuating means and compared to programmed input set points. When the signal from the detector corresponds to the programmed input set points of the actuating means 12, an actuating signal is delivered from the actuating means 12 to the control valves for closing the valves presently open and opening the next successive valve for automatically directing the flow of gas through a different adsorber.

Gas flowing from the detector 16 flows through the gas headers 16, through the single open control valve 14 and into its respective adsorber. Initially gas will be flowing through a first adsorber 18 which contains an adsorbent constructed to absorb and remove the component of the sample stream which is separated within and first discharged from the fractionation column 2. Fluid discharging from the first adsorber 18, generally carrier gas, is discharged from the system through line 32.

A signal delivered from the actuating means 12, representative of a change in component flow through the detector, is received by the control valves of the first and second adsorbers 18, 20. That signal functions to close the valve of the first adsorber 18 and open the valve of the second adsorber 20. The second component of the sample stream which is separated within and secondly discharged from the fractionation column 2 is thereby permitted to flow through the second adsorber 20. The second adsorber 20 contains an adsorbent constructed to adsorb and remove the second component that is discharged from the fractionation column 2. In like manner, the various components of the sample stream are successively discharged from the fractionation column 2, flow through the detector, the gas header and into and through their respective adsorbers in contact with adsorbent material constructed to remove the component of the sample stream and discharge the accompanying carrier gas.

Referring to FIG. 2, there sometimes exists in a sample stream, two or more components that are desired to be separated and recovered but are unable to be effectively discharged from the column 2 in spaced positions. These closely related components may be selectively separated and recovered by passing the multi-component portion of the sample stream through a primary and secondary adsorber connected in series. The primary adsorbers are connected to the gas header as the previously described single adsorbers. Upon passage of a first multi-component gas slug through the detector 10, the valve associated with the ing materials and operation of effective temperature limits have been calculated and determined through pilot tests to assure a continuous component separation and recovery method which will reduce construction equipment and maintenance and supervision expenditures of heretofore utilized equipment while increasing the purity and volume of component recovery. Preferred operational temperatures for all adsorbents of this table are about ambient temperature.

TABLE I

| Gas component | Adsorbing material | Column arrangement | Adsorber, temperature range |
|---|---|---|---|
| Perfluorocyclobutane | 13 X mol sieve | Parallel | −50° F. to 150° F.* |
| Cis-1H, 2H-hexafluorocyclobutane | do | do | −50° F. to 150° F.* |
| Trans-1H, 2H-hexafluorocyclobutane | do | do | −50° F. to 150° F.* |
| 1H, 1H, 2H-pentofluorocyclobutane | do | do | −50° F. to 150° F.* |
| Paraffins, isoparaffins or aromatics | Charcoal or mol sieves | do | Ambient to 200° F. |
| Olefins | Charcoal, alumina or mol sieves | do | −50° F. to 150° F. |
| 1,2-dichlorotetrafluoroethane 1,1,2-trifluoro-2-chloroethane | 5A mol sieve followed by 10X or 13X mol sieves | Series | 0° to 100° F. |
| Tetrafluoroethylene Chlorotrifluoromethane | do | do | −50° to 150° F.* |
| n-Pentane iso-Pentane | do | do | Ambient to 200° F. |

*Preferred temperature is ambient or slightly below.

first primary adsorber is opened to allow passage of said multi-component slug therethrough. A first component of the multi-component gas slug is selectively adsorbed by the adsorbing material within the first primary adsorber. A second component of the multi-component gas slug and its accompanying carrier gas discharges from the first primary adsorber and passes through the first secondary adsorber. The second component of the multi-component gas slug is selectively adsorbed by the adsorbing material within the first secondary adsorber. In like manner, the multi-component gas slug successively passes through different individual adsorbers which selectively adsorb a different and individual gas component until only carrier gas discharges from a final adsorber and is removed from the system.

A subsequent second multi-component gas slug is directed through the second primary adsorber, the second secondary adsorber, etc.

The gas components recovered within each adsorber of this invention are thereafter removed by externally heating the adsorbing material in the absence of purge gas or other means to recover the components from the adsorber which would contact and contaminate said components. The temperature required for recovery of each component depends upon various factors, such as the composition of the component, adsorbing material, and the construction of the adsorber. The efficient recovery temperature is easily acquired by laboratory tests and pilot runs. The method of this invention is thereafter adapted for testing and large scale production purposes.

A study of the method of this invention discloses that not only single components can be selectively and automatically recovered from a sample stream, but single components can also be selectively and automatically removed from a multi-component gas slug that has been separated from the sample stream.

Data for programming the signal actuating means is obtained by pilot tests which determine the sequence of the components entering the detector and what components are present during each (kick) or signalled increase of the detector. After this information is obtained, the adsorbing material to be used and the sequence of use is determined.

Owning to the fact that a plurality of gas components comprise the sample gas or gas stream and a plurality of individual and different adsorbing materials are utilized to recover said components, the following table lists the recommended adsorbing materials for selectively, automatically recovering certain gas components and the recommended temperature limits within which an adsorber containing that particular adsorbing material can be effectively operated. The selection of the following adsorb- Utilizing the method of this invention thus solves the problems of large construction, maintenance, equipment, and supervision expenditures, lower recovery volumes, and decreased purity of recovered components that were characteristic of heretofore utilized methods of recovering gaseous components from a gas component separating system. Other modifications and alterations of this invention will become apparent to those skilled in the art from the foregoing discussion and accompanying drawing, and it should be understood that this invention is not to be unduly limited thereto.

That which is claimed:

1. A method of separating constituents of an effluent stream from a separation zone, wherein such effluent stream comprises a carrier gas and at least first and second other constituents, said first and second constituents appearing in the effluent stream at about the same time, which method comprises:

passing the effluent stream through a first adsorption zone during the time that the first and second constituents appear therein, said first adsorption zone containing a first material that selectively adsorbs the first constituent, passing the effluent from the first adsorption zone through a second adsorption zone which contains a second material that selectively adsorbs the second constituent, and thereafter heating said first and second adsorption zones to recover the constituents adsorbed therein.

2. A method, as set forth in claim 1 wherein the effluent stream contains a third constituent, including programming a valve control system to terminate the flow of gas through the first and associated second adsorption zones and initiate the flow of gas through a third adsorber in response to a detector delivered signal indicating a change in component flow of the effluent stream, providing different adsorbing material in each adsorption zone, and arranging the sequence of each adsorption zone so that a component of the sample system directed to each adsorption zone is adsorbed by the adsorbent material of that adsorption zone.

3. A method, as set forth in claim 1, including providing a number of individual adsorption zones equal to the number of different components to be recovered from the effluent stream, each of said adsorption zones containing an adsorption material that selectively adsorbs one of the components of the effluent stream, and at least a portion of the adsorption zones being connected parallel relative to a serially connected portion of the adsorption zones.

4. A method, as set forth in claim 1, including passing at least one portion of the gas stream through more than one adsorption zone and passing other portions of the gas stream through only one adsorption zone.

5. A method, as set forth in claim 1, for adsorbing and recovering fluoro carbons by passing the gas stream through a 13× molecular sieve second adsorption zone.

6. A method, as set forth in claim 1, wherein a 5A molecular sieve first adsorption zone followed by a 10× molecular sieve second adsorption zone is provided for first adsorbing 1,2-dichlorotetrafluoroethane followed by the adsorption of 1,1,2-trifluoro-2-chloroethane.

7. A method, as set forth in claim 1, wherein a 5A molecular sieve first adsorption zone followed by a 13× molecular sieve second adsorption zone is provided for first adsorbing 1,2-dichlorotetrafluoroethane followed by the adsorption of 1,1,2-trifluoro-2-chloroethane.

References Cited
UNITED STATES PATENTS

| | | | |
|---|---|---|---|
| 3,002,583 | 10/1961 | Findlay | 55—197 X |
| 3,029,575 | 4/1962 | Eng et al. | 55—75 X |

J. L. DeCESARE, Primary Examiner

U.S. Cl. X.R.

55—75